(12) United States Patent
Kollath et al.

(10) Patent No.: US 9,802,585 B2
(45) Date of Patent: Oct. 31, 2017

(54) LINKAGE ASSEMBLY

(71) Applicant: Deere & Company, Moline, IL (US)

(72) Inventors: Michael D. Kollath, Reinbeck, IA (US); Christopher A. Bering, Dike, IA (US); Scott A. Hudson, Cedar Falls, IA (US); Scott A. Tebbe, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 214 days.

(21) Appl. No.: 14/553,017

(22) Filed: Nov. 25, 2014

(65) Prior Publication Data

US 2016/0144837 A1    May 26, 2016

(51) Int. Cl.
*F16H 27/02* (2006.01)
*B60T 7/06* (2006.01)
*G05G 7/02* (2006.01)
*B60T 11/18* (2006.01)
*B60T 7/02* (2006.01)

(52) U.S. Cl.
CPC ............... *B60T 7/06* (2013.01); *B60T 11/18* (2013.01); *G05G 7/02* (2013.01); *B60T 7/02* (2013.01)

(58) Field of Classification Search
CPC ... B60T 7/06; B60T 11/18; B60T 7/02; G05G 7/02
See application file for complete search history.

(56) References Cited

U.S. PATENT DOCUMENTS 3,343,564 A * 9/1967 Peeples ................. F16K 15/044
                                                    137/539
3,851,473 A * 12/1974 Bainbridge ........... B60T 13/146
                                                    60/552
4,603,600 A * 8/1986 Yamazaki .............. B60T 7/101
                                                    74/503

(Continued)

FOREIGN PATENT DOCUMENTS

DE          19543698 C1    3/1997
DE      102010042694 A1    2/2012

(Continued)

OTHER PUBLICATIONS

European Search Report issued in counterpart application No. EP15188052.3, dated May 6, 2016 (7 pages).

(Continued)

*Primary Examiner* — Zakaria Elahmadi

(57) ABSTRACT

A linkage assembly couples a plunger of a brake valve to a manually operated brake input member. The linkage assembly includes a pushrod and a resilient member. The pushrod has an end member which is engagable with the plunger. The resilient member is attached to the pushrod end member. The resilient member has an end which is engagable with the plunger when the pushrod end member is spaced apart from the plunger. The resilient member deforms to allow the pushrod end member to directly engage the plunger when the pushrod end member is moved towards the plunger. One of the end and resilient members surrounds a portion of the other of the end and resilient members. The resilient member may be a sleeve which surrounds an end portion of the pushrod. Or, the resilient member may be surrounded by a hollow end portion of the pushrod.

16 Claims, 5 Drawing Sheets

(56) References Cited

U.S. PATENT DOCUMENTS

| | | | | |
|---|---|---|---|---|
| 4,752,163 | A * | 6/1988 | Fedor | B23G 1/26 |
| | | | | 403/326 |
| 4,909,096 | A * | 3/1990 | Kobayashi | F16H 59/10 |
| | | | | 192/220.3 |
| 5,259,195 | A * | 11/1993 | Pringle | B60T 11/12 |
| | | | | 303/62 |
| 7,287,457 | B1 * | 10/2007 | Gualdoni | F15B 15/261 |
| | | | | 60/589 |
| 2002/0189909 | A1 * | 12/2002 | Buckley | B60T 1/065 |
| | | | | 188/73.31 |
| 2004/0187261 | A1 * | 9/2004 | Haenlein | E05D 3/10 |
| | | | | 16/366 |
| 2012/0186546 | A1 * | 7/2012 | Cecur | F01L 1/146 |
| | | | | 123/90.15 |
| 2013/0008751 | A1 * | 1/2013 | Dunlap, III | B62L 3/023 |
| | | | | 188/347 |
| 2013/0199364 | A1 * | 8/2013 | Weiberle | B60L 7/18 |
| | | | | 92/139 |

FOREIGN PATENT DOCUMENTS

| | | | | |
|---|---|---|---|---|
| GB | 550138 | A * | 12/1942 | B60T 7/06 |
| GB | 2309275 | A | 7/1997 | |

OTHER PUBLICATIONS

Overview of the brake pedal linkage and brake valve. Section view of pushrod to brake valve interface on existing designs (2 pages).

* cited by examiner

LINKAGE ASSEMBLY

FIELD

The present disclosure relates to a linkage assembly, such as a linkage which connects a brake pedal to a plunger of a brake valve.

BACKGROUND

Many off highway vehicles utilize a hydraulically powered brake system to provide braking of one or more wheels and/or axles. These systems typically consist of a hydraulic brake valve, brake pedals operated by the driver of the vehicle, and a linkage to transmit force from the pedals to the valve. In certain of such systems, the linkage includes a pin joint which transmits the force from the brake pedals to the pushrods, and the pushrods then press against a plunger which is part of the brake valve. Depressing the plunger actuates the brakes. A guide bushing keeps the pushrod in a mostly vertical orientation. The bushing, however, creates a pushrod motion such that as the top pin joint swings along an arc with the pedal. This causes the lower end of the pushrod to move horizontally as well as vertically, and the end of the pushrod slides or "scrubs" over the surface of the plunger, causing wear on both parts.

In addition, hydraulic systems can inherently have pressure ripple and vibration. This vibration can be transmitted from the brake valve, through the plunger and the pushrod to the pedals. Such vibration can generate noise or other inconveniences to an operator of the vehicle.

In John Deere self propelled sprayers, an additional extension spring is added to hold the pushrod off of the brake valve plunger when the brakes are not being applied. To do this, one end of the spring is fixed to a control support, and the other attached to the pushrod itself. An additional upstop is required to limit upward pedal travel due to this spring. Upon braking, the spring is stretched by the force applied to the pedals and pushrod, allowing the gap between the pushrod and brake valve to close, thus allowing the pushrod to depress the plunger. This design requires additional components (spring, mounting bracket, upstop for pedals) and the added resistance in the system which reduces the force delivered to the brake valve plunger because the extension spring counteracts some of the force applied by the operator.

A simple means to isolate the brake pedals and linkages from the hydraulic vibrations of the valve is desired.

SUMMARY

According to an aspect of the present disclosure, a linkage assembly couples a plunger of a brake valve to a manually operated brake input member. The linkage includes a pushrod and a resilient member. The pushrod has an end member which is engagable with the plunger. The resilient member is attached to the pushrod end member, and has an end which is engagable with the plunger when the pushrod end member is spaced apart from the plunger. The resilient member deforms to allow the pushrod end member to directly engage the plunger when the pushrod end member is moved towards the plunger. One of the end and resilient members surrounds a portion of the other of the end and resilient members.

According to an aspect of a first embodiment of the present disclosure, the resilient member is a hollow sleeve which receives an end portion of the pushrod. The pushrod has a larger diameter main body and a smaller diameter end portion. The sleeve has an axial length which longer than an axial length of the end portion. The end portion is joined to the main body by an annular shoulder, and an end of the sleeve engages the shoulder.

Thus, in the first embodiment, a tube-shaped rubber (or other elastomer) element is installed onto a reduced diameter on the end of the pushrod. The tube extends beyond the end of the pushrod so that during normal operations without the brakes applied, the tube holds the metal pushrod off of the surface of the metal plunger on the valve.

During braking, the tube compresses, allowing the steel pushrod to travel down until it contacts the brake valve plunger and then depresses the plunger. This provides a solid, durable metal to metal interface to transmit the high forces used for braking. The tube can be a relatively soft rubber or other material that provides good vibration damping without needing to have high wear resistance or high compressive strength, as it does not transmit much force. Also, because the tube is not pinched between the pushrod and the plunger, the tube can flex to take up some of the 'scrubbing' motion, reducing the wear on its surfaces.

According to an aspect of a second embodiment of the present disclosure, the pushrod includes a blind bore which opens towards the plunger, and the resilient member is received by the blind bore. An end of the resilient member is external to the blind bore when the pushrod is spaced apart from the plunger. The blind bore includes a larger diameter outer bore and a smaller diameter inner bore. The resilient member has an axially inner part and an axially outer part. The inner part engages a wall of the inner bore. The outer part is spaced apart from a wall of the outer bore. The resilient member has an axial length which longer than an axial length of the blind bore. The resilient member has an inner end which is received and compressed by an inner end of the blind bore. The resilient member may have a polygonal cross-sectional shape, and may have a quadrilateral polygonal cross-sectional shape. The resilient member has corners which engage a wall of the blind bore.

Thus, in the second embodiment, a rubber (or other elastomer) element is inserted into a blind hole drilled in the end of the pushrod. The elastic element extends beyond the end of the pushrod so that during normal operations without the brakes applied, the elastic element holds the metal pushrod off of the surface of the metal plunger on the valve, isolating the pushrod and pedal from vibration.

The elastic element is a rubber part that may have a square cross section. The bore in the end of the rod is stepped, with an outer larger diameter bore and an inner smaller diameter bore. The larger diameter bore at the end of the rod and has a diameter larger than the corner-to-corner size of the rubber element. This provides room for the rubber element to compress without becoming bound up due to friction on the sides of the hole. The smaller diameter bore is sized so that the corners of the square section of rubber will engage and be compressed by the sides of the smaller bore. This provides a press fit which holds the rubber element into the pushrod. The small bore diameter, however, is larger than the flat-to-flat dimension of the rubber square element. This allows areas for air to be pushed past the rubber element as it is being installed into the hole, preventing a situation where air is trapped and compressed behind the rubber part, preventing it from being installed fully.

During braking, the elastic element compresses into the pushrod within the larger diameter bore so that the pushrod can move towards and contact the brake valve plunger directly. This provides a solid, durable, metal to metal interface to transmit the high forces used for braking. The rubber element may be relatively soft material (rubber or other materials) which provides good vibration damping without needing to have high wear resistance or high compressive strength, as it does not transmit much force.

In both embodiments, the elastic element does not substantially counteract the force applied by the operator when braking. Also, because of the limited length of the elastic element, there is no need for an upstop to limit upward travel of the pedals, reducing cost of the system. The result is a simpler design.

DETAILED DESCRIPTION OF THE DRAWINGS

Figure 1:
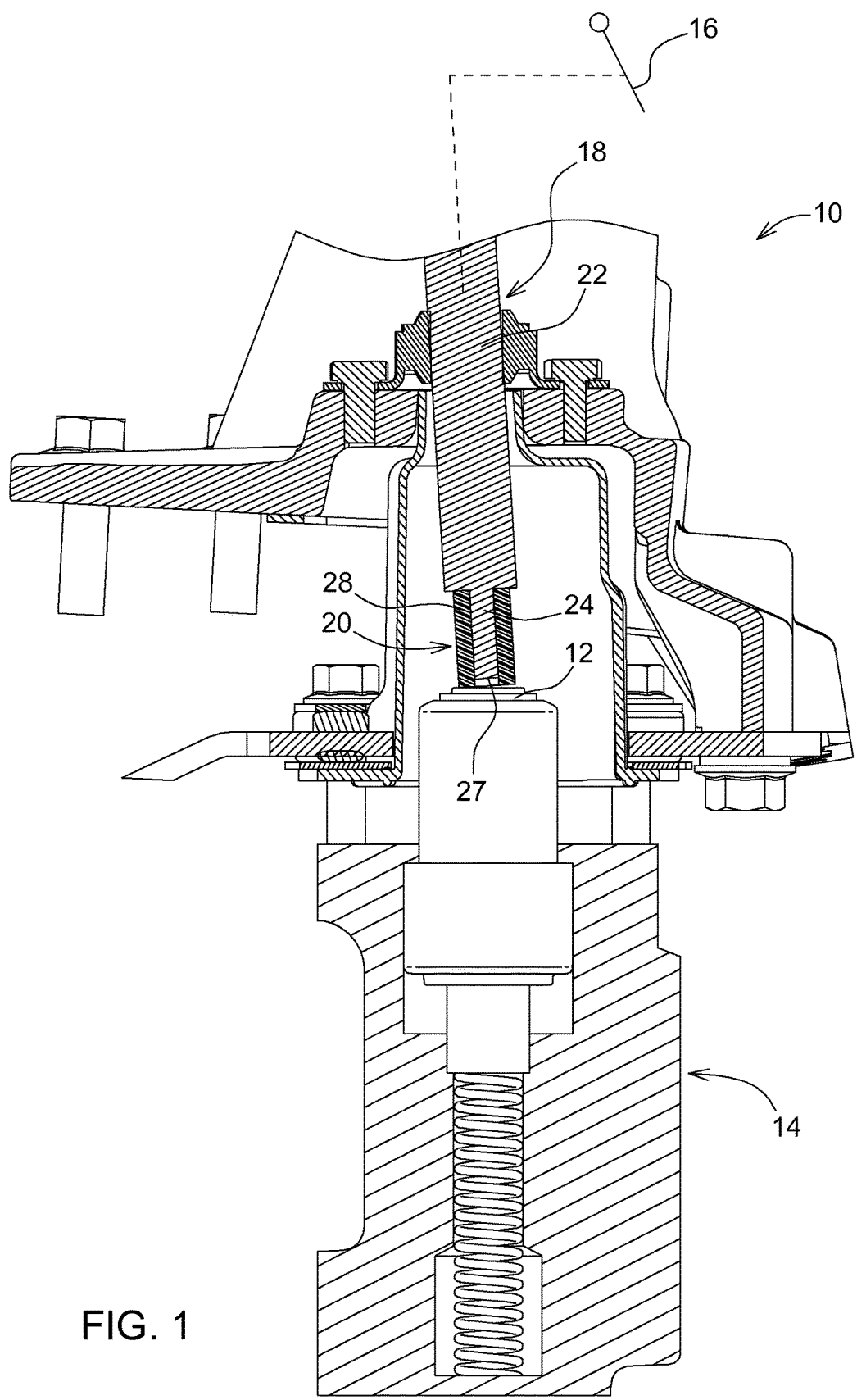
FIG. 1 is a partially sectional view of a linkage assembly embodying the invention.
Figure 2:
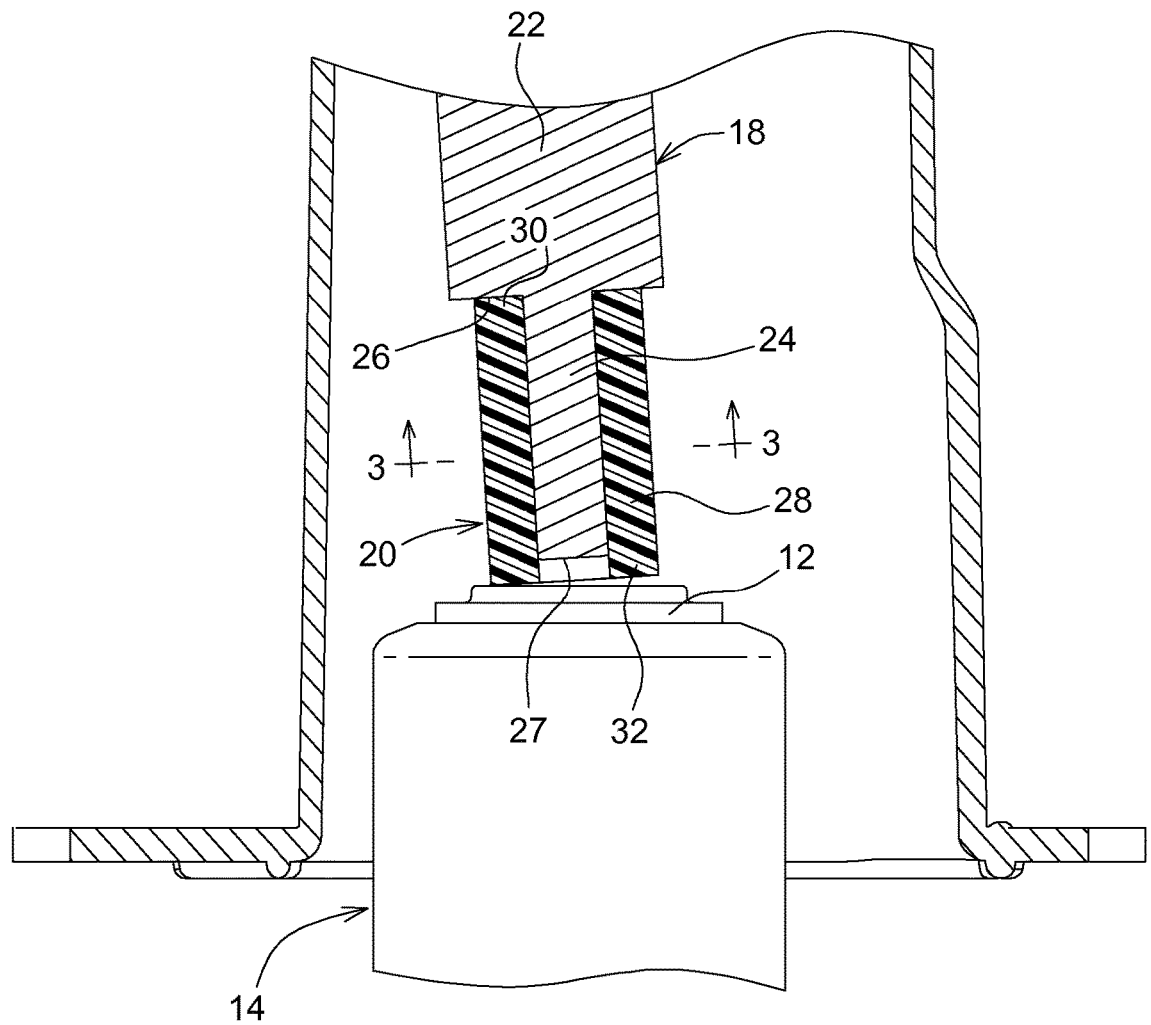
FIG. 2 is an enlarged view of a portion of FIG. 1.
Figure 3:
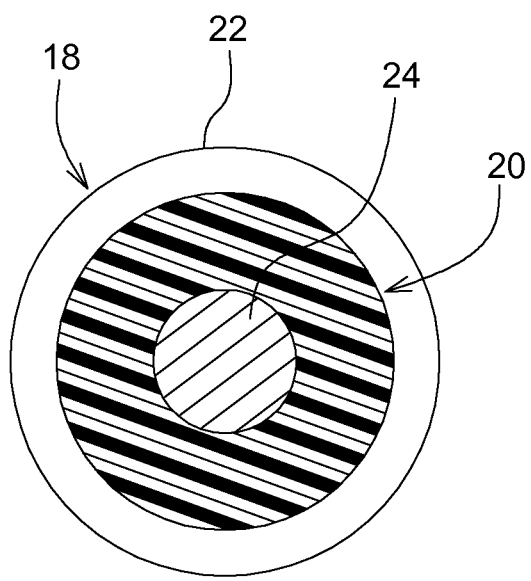
FIG. 3 is a view taken along lines 3-3 of FIG. 2.
Figure 4:
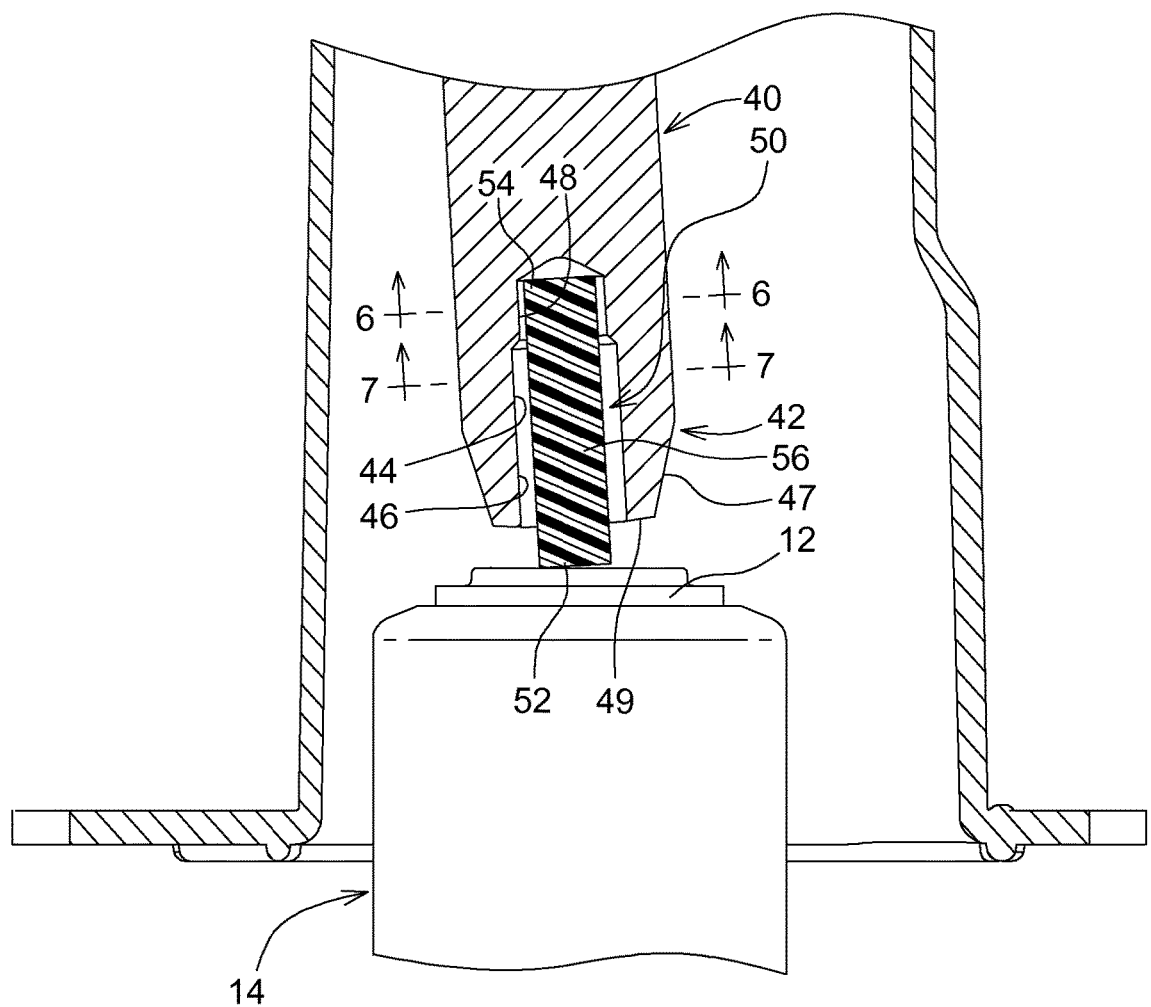
FIG. 4 is a partially sectional view of an alternate embodiment of the linkage assembly embodying the invention.
Figure 5:
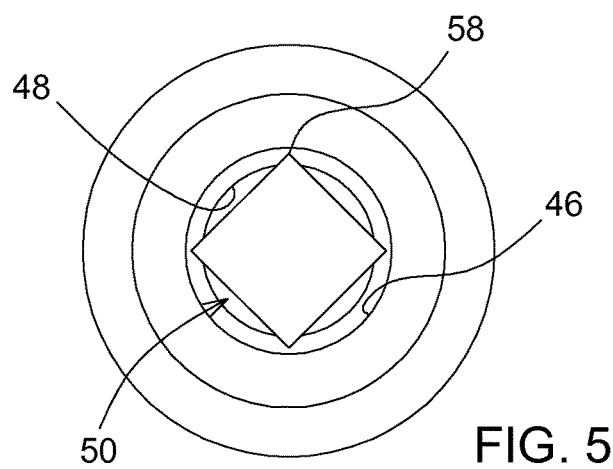
FIG. 5 is an end view of a the linkage assembly of FIG. 4.

Referring to FIGS. 1-3, the linkage assembly 10 couples a plunger 12 of a an actuator, such as brake valve 14, to an input member, such as a manually operated brake input member 16, such as a brake pedal. The linkage assembly 10 includes a pushrod 18 and a resilient member 20 or elastomeric element. The push rod 18 preferably has a circular cross sectional shape. The pushrod 18 has a larger diameter main body 22 and a smaller diameter end portion 24. The end portion or end member 24 is joined to the main body 22 by an annular shoulder 26. The pushrod 18 has an outer end 27 which is engagable with the plunger 12.

The resilient member 20 is a hollow sleeve 28 which receives and surrounds the end portion 24 of the pushrod 18. The sleeve 28 has an axial length which longer than an axial length of the end portion 24. The sleeve 28 has an inner end 30 which engages the shoulder 26. The sleeve 28 has an outer end 32 which is engagable with a surface of the plunger 12. The outer end 32 is spaced apart axially outwardly from the outer end 27 of the pushrod 18. Thus, the resilient member 20 is coupled to the pushrod 18, and the resilient member 20 has an end 32 which is engagable with the plunger 12 when the pushrod 18 is spaced apart from the plunger 12. The resilient member 20 deforms to allow the pushrod 18 to directly engage the plunger 12 when the pushrod 18 is moved towards the plunger 12.

Referring now to FIGS. 4-7, the pushrod 40 has a hollow end 42 in which is formed a blind bore 44 which opens towards the plunger 12. The blind bore 44 includes a larger diameter axially outer bore 46 and a smaller diameter axially inner bore 48. An end portion 47 of the pushrod 40 is tapered and terminates at an annular end or contact surface 49.

A solid resilient member 50 is received by the blind bore 44. The resilient member 50 has an axial length which longer than an axial length of the blind bore 44. The resilient member 50 has an outer end 52 which is external to the blind bore 44 when the pushrod 40 is spaced apart from the plunger 12.

Figure 6:
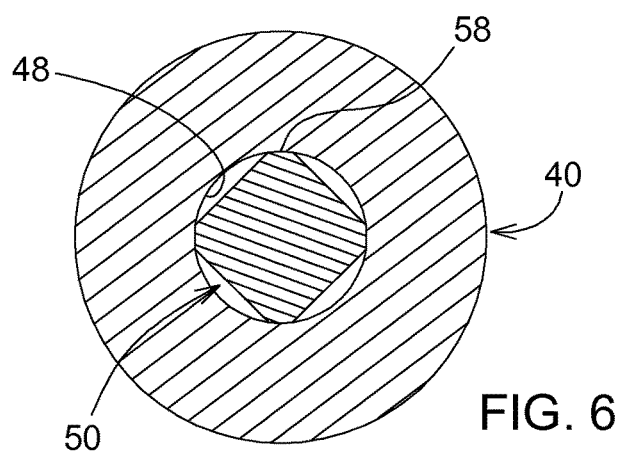
FIG. 6 is a view taken along lines 6-6 of FIG. 4.
Figure 7:
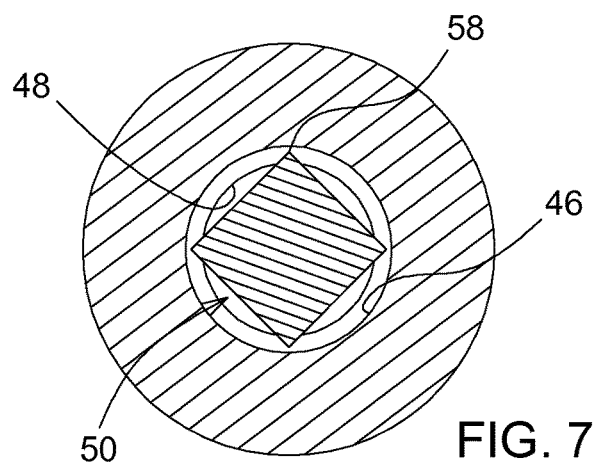
FIG. 7 is a view taken along lines 7-7 of FIG. 4.

The resilient member 50 includes an axially inner part 54 and an axially outer part 56. The inner part 54 engages a wall of the inner bore 48. The outer part 56 is spaced apart from a wall of the outer bore 46. The inner part 54 is received and compressed by inner bore 48. Preferably, the resilient member 50 may have a polygonal cross-sectional shape which forms a plurality of corners 58. The resilient member 50 may have a quadrilateral polygonal cross-sectional shape. As best seen in FIG. 6, the corners 58 engage and are compressed by the wall of the inner bore 48.

The result is brake pedal linkage assembly designs which include an elastomeric element to dampen vibration between a hydraulic brake valve and the pedals in the cab of an agricultural vehicle.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A linkage assembly which couples a plunger of an actuator to a manually operated input member, the linkage assembly comprising:
   a pushrod comprising a blind bore which opens towards the plunger; and
   a resilient member coupled to the pushrod and received by the blind bore, an end face of the resilient member being engagable with an end face of the plunger when the pushrod is spaced apart from the plunger, the end face of the resilient member being external to the blind bore when the pushrod is spaced from the plunger, the resilient member deforming to allow an end face of the pushrod to directly engage the end face of the plunger when the pushrod is moved towards the plunger, and the end face of the resilient member being completely radially encapsulated by the blind bore when the end face of the pushrod directly engages the end face of the plunger.

2. The linkage assembly of claim 1, wherein:
   the resilient member comprises a sleeve which receives and is in contact with an end portion of the pushrod, and the sleeve is a solid annular cylinder.

3. The linkage assembly of claim 1, wherein:
   the pushrod comprises a larger diameter main body and a smaller diameter end portion; and
   the resilient member comprises a sleeve which receives and is in contact with the end portion of the pushrod, and the sleeve is a solid annular cylinder.

4. The linkage assembly of claim 3, wherein:
   the sleeve has an axial length which is longer than an axial length of the end portion when the pushrod is spaced apart from the plunger, and the sleeve has an axial length which is equivalent to the axial length of the end portion when the end face of the pushrod directly engages the end face of the plunger.

5. The linkage assembly of claim 3, wherein:
   the end portion is joined to the main body by an annular shoulder; and
   an end of the sleeve engages the shoulder.

6. The linkage assembly of claim 1, wherein:
the blind bore comprises a larger diameter outer bore and a smaller diameter inner bore, the outer bore and the inner bore both face radially inwards towards the resilient member; and
the resilient member comprises an axially inner part and an axially outer part, the inner part engaging a wall of the inner bore.

7. The linkage assembly of claim 6, wherein:
the outer part is spaced apart from a wall of the outer bore.

8. The linkage assembly of claim 1, wherein:
the resilient member has an axial length which is longer than an axial length of the blind bore when the pushrod is spaced apart from the plunger, and the resilient member has an axial length which is equivalent to the axial length of the blind bore when the end face of the pushrod directly engages the end face of the plunger.

9. The linkage assembly of claim 1, wherein:
the resilient member has an inner end which is received and compressed by an inner end of the blind bore.

10. The linkage assembly of claim 1, wherein:
the resilient member has a polygonal cross-sectional shape.

11. The linkage assembly of claim 10, wherein:
the resilient member has corners which engage a wall of the blind bore.

12. The linkage assembly of claim 10, wherein:
the blind bore comprises a larger diameter outer bore and a smaller diameter inner bore; and
the smaller diameter inner bore has a diameter which is smaller than a corner to corner dimension of the resilient member.

13. The linkage assembly of claim 10, wherein:
the resilient member has a quadrilateral polygonal cross-sectional shape.

14. The linkage assembly of claim 12, wherein:
the resilient member has corners which engage a wall of the blind bore.

15. The linkage assembly of claim 1, wherein:
the actuator comprises a brake valve and the input member comprises a manually operated brake input member.

16. A linkage assembly which couples a plunger of an actuator to a manually operated input member, the linkage assembly comprising:
a pushrod comprising a larger diameter main body and a smaller diameter end portion; and
a resilient member coupled to the pushrod, the resilient member comprising a sleeve which receives and is in contact with the end portion of the pushrod, the sleeve being a solid annular cylinder, an end face of the resilient member being engagable with an end face of the plunger when the pushrod is spaced apart from the plunger, the sleeve having an axial length which is longer than an axial length of the end portion when the pushrod is spaced from the plunger, the resilient member deforming to allow an end face of the pushrod to directly engage the end face of the plunger when the pushrod is moved towards the plunger, and the sleeve having an axial length which is equivalent to the axial length of the end portion when the end face of the pushrod directly engages the end face of the plunger.

* * * * *